United States Patent
Abi-Nassif et al.

(10) Patent No.: US 7,277,446 B1
(45) Date of Patent: Oct. 2, 2007

(54) COMMUNICATION OF DIGITAL DATA OVER A WIRELESS TRANSMISSION MEDIUM

(75) Inventors: Firas Abi-Nassif, Medford, MA (US); Dae-Young Kim, Lexington, MA (US); Pierre A. Humblet, Cambridge, MA (US); M. Vedat Eyuboglu, Concord, MA (US)

(73) Assignee: Airvana, Inc., Chelmsford, MA (US)

( * ) Notice: Subject to any disclaimer, the term of this patent is extended or adjusted under 35 U.S.C. 154(b) by 803 days.

(21) Appl. No.: 09/704,898

(22) Filed: Nov. 2, 2000

(51) Int. Cl.
*H04L 12/28* (2006.01)
*H04L 12/56* (2006.01)

(52) U.S. Cl. ............... 370/412; 370/414; 370/413; 370/417; 370/418; 370/235; 370/395.21; 370/332

(58) Field of Classification Search ........... 370/230, 370/230.1, 231–235, 235.1, 236, 428, 429, 370/412, 310, 332, 395.21, 395.72, 468, 370/395.4, 328, 450, 466, 452, 229, 413, 370/414, 417, 418; 455/450, 446, 452, 466
See application file for complete search history.

(56) References Cited

U.S. PATENT DOCUMENTS

| | | | |
|---|---|---|---|
| 5,982,748 A | | 11/1999 | Yin et al. |
| 6,069,872 A | * | 5/2000 | Bonomi et al. ............ 370/236 |
| 6,104,700 A | * | 8/2000 | Haddock et al. ........... 370/235 |
| 6,229,795 B1 | * | 5/2001 | Pankaj et al. .............. 370/329 |
| 6,470,016 B1 | * | 10/2002 | Kalkunte et al. ...... 370/395.41 |
| 6,567,420 B1 | * | 5/2003 | Tiedemann et al. ........ 370/468 |
| 6,590,890 B1 | * | 7/2003 | Stolyar et al. ............. 370/349 |
| 6,850,540 B1 | * | 2/2005 | Peisa et al. ................ 370/468 |
| 6,850,764 B1 | * | 2/2005 | Patel ......................... 455/450 |
| 6,865,185 B1 | * | 3/2005 | Patel et al. ................ 370/412 |
| 6,999,420 B1 | * | 2/2006 | Chiu et al. ................. 370/132 |
| 7,003,578 B2 | * | 2/2006 | Kanada et al. ............. 709/230 |
| 7,027,394 B2 | * | 4/2006 | Gupta et al. ............. 370/230.1 |
| 7,054,267 B2 | * | 5/2006 | Ramanan et al. .......... 370/229 |
| 7,072,360 B2 | * | 7/2006 | Dravida et al. ............ 370/468 |
| 7,088,678 B1 | * | 8/2006 | Freed et al. ............... 370/230 |

FOREIGN PATENT DOCUMENTS

| | | |
|---|---|---|
| WO | WO 97/36405 | 10/1997 |
| WO | WO 98/45976 | 10/1998 |
| WO | WO 99/48310 | 9/1999 |
| WO | WO 00/28705 | 5/2000 |

OTHER PUBLICATIONS

Bender et al., CDMA/HDR Wireless Data Service, Jul. 2000, IEEE Communications Magazine, pp. 70-77.*

(Continued)

*Primary Examiner*—Edan Orgad
*Assistant Examiner*—Chuong Ho
(74) *Attorney, Agent, or Firm*—Fish & Richardson P.C.

(57) ABSTRACT

Data packets are received at a communications node. Each of the received data packets is associated with one of a set of different service classes. Packets corresponding to the received data packets are transmitted to recipients. The order in which the data packets are transmitted is controlled based on the transmission rate and the service class of the packets.

33 Claims, 2 Drawing Sheets

OTHER PUBLICATIONS

Jalali et al., Data Throughput of CDMA-HDR, May 2000, Vehicular Technology Conference Proceedings, vol. 3.*

Data throughput of CDMA-HDR, Jalali et al.*

P. Bender, et al., "CDMA/HDR: A Bandwidth-Efficient High-Speed Wireless Data Service for Nomadic Users", *IEEE Communications Magazine*, Jul. 2000.

TIA/EIA/TSB-115, "Wireless IP Architecture Based on IETF Protocols", Jul. 14, 2000.

TIA/EIA/IS-835, "Wireless IP Network Standard", *3rd Generation Partnership Project 2(3GPP2)*, Version 1.0, Jul. 14, 2000.

Ross Callon, A Viswanathan, and E. Rosen, "Multiprotocol Label Switching Architecture", Jan. 2001.

S. Blake, et al., "An Architecture for Differentiated Services", *IETF RFC 2475*, Dec. 1998.

A. Jalali, R. Padovani, R. Pankaj, "Data Throughput of CDMA-HDR a High Efficiency-High Data Rate Personal Communication Wireless System", *Vehicular Technology Conference VCT2000 Proceedings*, vol. 3, May 2000.

S. Haykin, Adaptive Filter Theory, 2nd edition, Prentice Hall, 1991, pp./331-333, 485.

S. Floyd, and V. Jacobson, "Random Early Detection Gateways for Congestion Avoidance", *IEEE/ACM Transactions on Networking*, vol. 1, No. 4, Aug. 1993, pp. 397-413.

S. Floyd, and V. Jacobson, "Link-sharing and Resource Management Models for Packet Networks", *IEEE/ACM Transactions on Networking*, vol. 3, No. 4, Aug. 1995, pp. 365-386.

V. Jacobson, K. Nichols, K. Poduri, "An Expedited Forwarding PHB", IETF RFC, Jun. 1999.

TIA/EIA-828, "Abis Interface Specification", Jun. 2000.

J. D. Solomon, "Mobile IP—The Internet Unplugged", Prentice Hall, New Jersey, 1998.

3GPP2, "3GPP2 Access Network Interfaces Interoperability Specification", *A.S0001-A*, Nov. 30, 2000.

3GPP2, "cdma2000 High Rate Packet Data Air Interface Specification", Ballot Resolution Version, *C.P9010*, Sep. 12, 2000.

\* cited by examiner

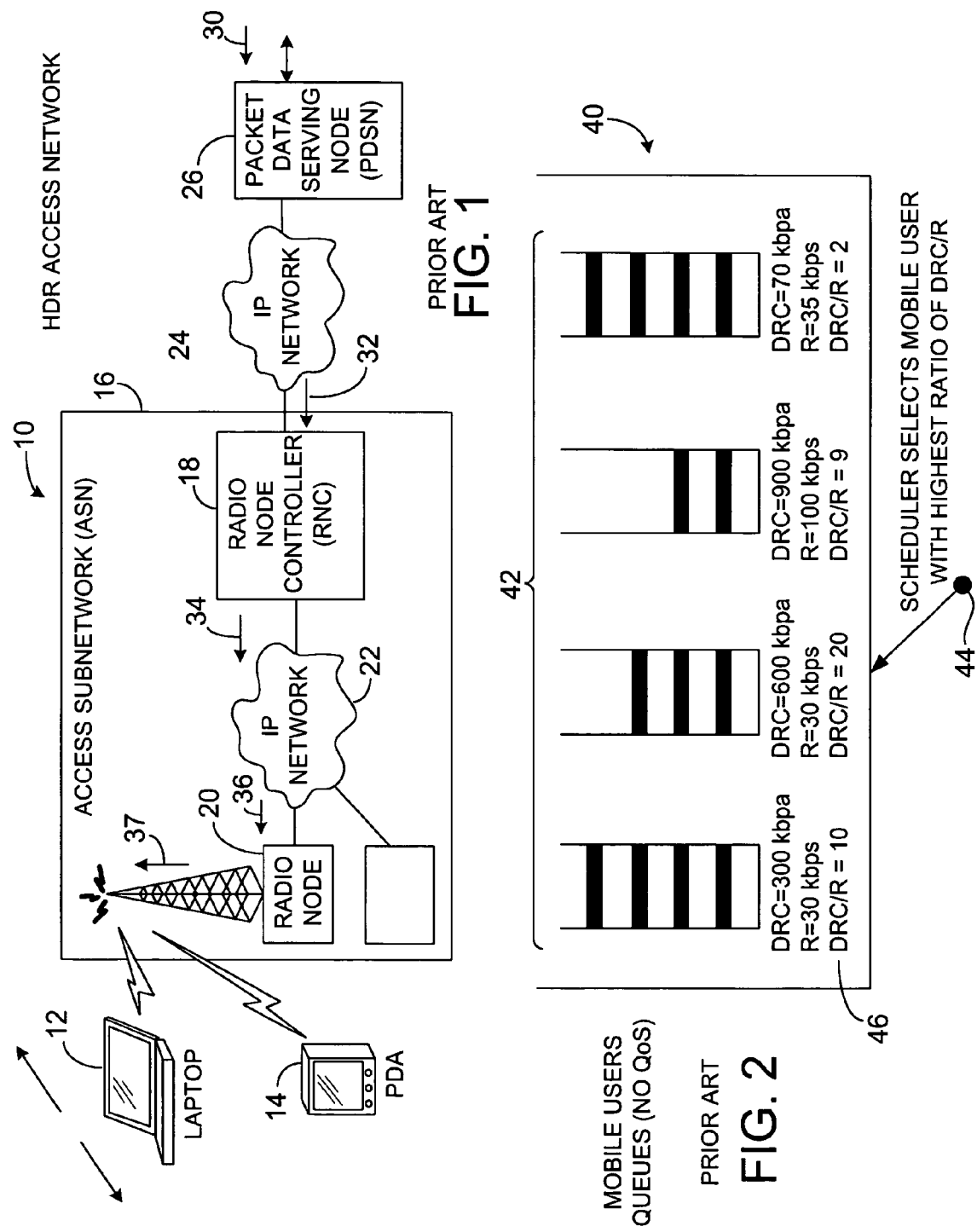

COMMUNICATION OF DIGITAL DATA OVER A WIRELESS TRANSMISSION MEDIUM

BACKGROUND

This invention relates to communication of digital data over a wireless transmission medium.

As shown in FIG. 1, a wireless radio network 10, for example, may use the High Data Rate (HDR) protocol. HDR is an emerging mobile wireless access technology that enables personal broadband Internet services that can be accessed from anywhere, anytime. (See P. Bender, et al., "CDMA/HDR: A Bandwidth-Efficient High-Speed Wireless Data Service for Nomadic Users", IEEE Communications Magazine, July 2000; and 3GPP2, "Draft Baseline Text for 1xEV-DO," Aug. 21, 2000, developed by Qualcomm Inc, both incorporated here by reference).

HDR is a new air interface optimized for IP packet data services, which can deliver a shared forward link transmission rate of up to 2.46 Mbits/s per sector using only (1x) 1.25 MHz of spectrum. Compatible with CDMA2000 radio access (see TIA/EIA/IS-2001, "Interoperability Specification (IOS) for CDMA2000 Network Access Interfaces," May 2000, by reference) and wireless IP network interfaces (see TIA/EIA/TSB-115, "Wireless IP Architecture Based on IETF Protocols," Jun. 6, 2000, and TIA/EIA/IS-835, "Wireless IP Network Standard," 3rd Generation Partnership Project 2 (3GPP2), Version 1.0, Jul. 14, 2000, both incorporated here by reference), HDR networks can be built entirely on IP technologies, all the way from the mobile Access Terminal (AT) to the global Internet, thus taking advantage of the scalability and low-cost of IP networks. HDR is being adopted by 3GPP2 as a new standard in the CDMA2000 family, an EVolution of the current 1xRTT standard for high-speed data-only (DO) services, formally referred to as 1xEV-DO.

In recent years, growth of IP networks has created a growing interest by network operators to offer differentiated service tiers that provide different levels of quality of service (QoS) to different users (user-level QoS), and to provide a differentiated treatment of different application flows of the same user (application-level QoS). Providing QoS on wireless access networks such as HDR is especially important to operators, because bandwidth is precious and effective management of that bandwidth is important.

Progress has been made in recent years in developing the underlying technologies for enabling QoS over IP networks (See Ross Callon, A Viswanathan, and E. Rosen, "Multiprotocol Label Switching Architecture," IETF Internet Draft, August 2000, and S. Blake, et al., "An Architecture for Differentiated Services," IETF RFC 2475, December 1998, incorporated by reference.)

However, mobile wireless networks introduce additional complexities in QoS delivery because of mobility and the variable bit rate nature of wireless transmissions.

The HDR Access Network Architecture:

Here the Access Terminal (AT) may be a laptop 12, a Personal Digital Assistant (PDA) 14 or a dual-mode voice/data handset, with built-in HDR support (not shown).

An HDR Radio Access Network (RAN) 10, which may cover a large service area of an operator, consists of one or more Access SubNetworks (ASN's) 16 each anchored by a Radio Node Controller (RNC) 18 communicating with several Radio Nodes (RN's) 20 over a private or public IP backhaul network 22. Each RN may support multiple sectors and each sector covers a certain cell area around the RN.

Each ASN is connected over a public or private IP network 24 to one or more Packet Data Serving Node's (PDSN's) 26. A PDSN can be viewed as an edge router that supports mobility; it maintains link layer connectivity to AT's through the RAN.

Data Path Over the HDR RAN in the Forward Direction:

The PDSN receives IP packets 30 from the Internet, identifies the user to which each packet is destined, determines the Class of Service (CoS) corresponding to each packet, and then encapsulates each packet into a tunnel packet indicating in the header of the tunnel packet the user and the CoS information.

The RNC extracts the payload data from the tunnel packets 32 arriving from the PDSN, and constructs from the payload data HDR application layer frames. Those HDR application layer frames are then encapsulated into tunnel packets 34 and sent towards the RN. The header of a tunnel packet indicates the CoS associated with that packet.

The RN receives the tunnel packets from the RNC, determines the CoS associated with each packet, retrieves the HDR application layer payload and constructs the HDR Physical Layer packets 36 to be transmitted to the AT's over the air-link.

HDR Protocol Operation:

When an AT is first powered-on inside the coverage area of an ASN, it typically opens a new HDR session with the RAN. An HDR session can be viewed as an "always-on" state between an AT and the RAN, which stays alive as long as the AT is powered on and remains in the coverage area of the RAN. When an AT has an open session, it can exchange HDR control messages with the RAN, but to exchange user data with the PDSN and beyond, it needs to establish a connection. Once connected, AT's consume air link resources, but only when they are actually exchanging data with the network. Connections are initiated by the AT by sending a Connection Request message to an RNC that makes a decision to accept or deny the request. In addition to Connection Admission Control, the RNC is primarily responsible for address/session management, RAN authentication, handling handoff events and for running the HDR application layer protocols.

Each RN consists of multiple sectors and each sector has a Forward Link Transmitter (FLT) and a Reverse Link Receiver (RLR) handling all air link and related protocol processing.

The FLT receives from the network interface variable-length HDR Application Layer frames from which it constructs MAC Layer frames. Forward link MAC Layer frames are always 128 bytes. The FLT combines MAC Layer frames that belong to the same AT in physical layer packets of length L=128, 256, 384 or 512 bytes, where the actual length depends on the bit rate, and then encodes, modulates and transmits them over the air link in a TDM fashion at a constant transmit power. Forward traffic packets are transmitted at variable bit rates that range from 38.4 kbit/s to 2.46 Mbit/s, specifically at rates k×38.4 kbit/s, where k=1, 2, 4, 8, 16, 24, 32, 48 or 64. In general, longer packets are used at higher bit rates. Variable-rate transmission is a key feature of HDR, as it allows the system to serve users at the highest rate that their channel condition would allow.

The basic building block of the HDR physical layer frame structure is a time slot of duration 1/600=1.67 ms. Time slots can be viewed as the basic shared transmission resource on the air link. All packets are carried in an integral number, N, of time slots, where N is 1, 2, 4, 8 or 16. For a given bit rate of k×38.4 kbit/s and packet size L, N can be easily determined: N=L/(8×k).

The transmission rate of a forward traffic packet is dynamically determined by the receiving AT's, which continuously estimate the signal-to-interference ratio (SIR) using pilot transmissions received from all sectors in their active list and report back, once every time slot, their individual bit rate requests to the ASN. In HDR, the bit rate request of user i at time t is referred to as the DRCi(t). It is important to note that a sector transmitting a packet to a user has to transmit at the bit rate selected by the AT, thus rate selection is entirely under the control of the AT. The sector can delay the transmission of a packet, but it cannot transmit at a rate that differs from the requested rate.

In every time slot, the system first checks to see if the next slot is empty (that is, if no packet transmission is continuing). If it is, it asks the scheduler to select the next packet for transmission, it encodes/modulates that packet and starts transmitting it in the empty slot. One scheduler, known as the Qualcomm algorithm, is described in A. Jalali, R. Padovani, R. Pankaj, "Data Throughput of CDMA-HDR a High Efficiency-High Data Rate Personal Communication Wireless System", Vehicular Technology Conference VCT2000 Proceedings, Volume 3, May 2000.

As shown in FIG. 2, in the Qualcomm algorithm, all users (represented by respective user queues 42) are treated equally by the RN. Each sector, in every time slot t, measures and updates the average (over an appropriate time window) data rate Ri(t) for every active user i. Whenever the scheduler 44 finds an empty time slot, it chooses for transmission the packet that belongs to the user who has the highest ratio of: DRCi(t)/Ri(t) 46, where DRCi(t) is the most recent requested rate of the i'th user.

Differentiated Services (DiffServ) Quality of Service (QoS)

QoS at a network node is the ability of that node to provide some level of assurance that the service requirements of the traversing traffic can be satisfied. To provide QoS, network nodes must manage their available link bandwidth according to application demands and network management settings. QoS parameters mainly include: bandwidth, delay, delay jitter and loss.

DiffServ is an architecture (among other architectures) defined by the Internet Engineering Task Force (IETF) in order to provide QoS. In the DiffServ model, traffic entering a network is classified and possibly conditioned at the boundaries of the network, before being assigned to different Behavior Aggregates (BA). Each behavior aggregate is identified by a single DiffServ Code Point (DSCP), a redefined layout of the IPv4 TOS byte. Within the core of the network, packets are forwarded according to the Per Hop Behavior (PHB) associated with the BA represented by the DSCP. Hence, several service classes can be differentiated on the basis of the DSCP field value by applying its forwarding behavior or PHB. At the ingress of a DiffServ network domain, packets are classified, policed and possibly shaped. The classification, policing and shaping rules used at the ingress routers, as well as the buffering space amount needed for these operations, derives from Service Level Agreements (SLA) negotiated between the network domains across which the data packets travel end-to-end. Two differentiated services have been proposed, the first being Expedited Forwarding (EF) and the second being Assured Forwarding (AF).

The EF DiffServ class is intended for real-time traffic which requires low loss, low latency, low jitter and guaranteed bandwidth. This implies that a DiffServ node that supports this service class must allocate a certain amount of forwarding resources (buffer space and bandwidth) for this traffic in order to ensure that such traffic encounters very small queues when exiting the node, and that the forwarding performance of EF traffic is independent of the load intensity of lower traffic classes.

The AF DiffServ class is intended to serve more elastic traffic that requires bandwidth guarantees. The IETF defines four AF classes where each AF class in a supporting DiffServ node is allocated fixed amounts of forwarding resources. Each of the four AF classes supports three levels of packet drop precedence. The drop precedence with which a packet is marked, indicates the relative importance of that packet when the DiffServ node is congested.

IP packets exchanged between the mobile user and the PDSN travel across the HDR RAN. According to DiffServ, the RN and the RNC must implement, in both the forward and the reverse directions, the PHB associated with an IP packet based on the value of the DSCP field of that packet. The PHB includes among other components, discarding, scheduling and marking IP packets.

SUMMARY

In general, in one aspect, the invention features a method that includes receiving data packets at a communications node, associating each of the received data packets with one of a set of different service classes, transmitting packets corresponding to the received data packets to recipients, and controlling the order in which packets are transmitted based on the transmission rate and the service class of the packets.

Implementations of the invention may include one or more of the following features. The transmitted packets may be physical layer packets. The transmission may be controlled based on a time-division multiplexing algorithm. The node may include a radio node of a communications protocol. The communications protocol may be HDR. The different classes of service may conform to a differentiated service architecture such as DiffServ. The service classes may include at least one expedited forwarding class and at least one assured forwarding class. A user-defined minimum average forwarding percentage rate may be received from an operator for at least one of the different service classes. The percentage may be a percentage of the total bandwidth of a link on which the packets are transmitted. The transmission rates may be determined by the recipients. The transmission rates may be sent by the recipients using a feedback channel to the node. The order in which packets are transmitted may be controlled by two-level scheduling including a class level in which rates are determined among the classes of service and a recipient level in which rates are determined among the recipients associated with each class. The class level scheduling may be based on at least one of the following for each of the classes: a configured minimum average forwarding rate percentage for the class, an actual forwarding rate percentage recently received by the class, and a channel quality for the recipients that belong to the class and are selected to receive service by the recipient level. The class level scheduling may be done over a predetermined length window of time slots. The class level scheduling may include a weighted round robin scheduling algorithm in which the weights correspond to channel quality of the recipients belonging to the respective classes. The class level scheduling may be based in part on a planned recipient level selection within each class. The class level scheduling may select a class from among a subset of the classes determined by pre-assigned schedule times.

In general, in another aspect, the invention features a method in which a network operator provides values representing minimum average forwarding rate percentages for each of more than one distinct classes of service associated with transmission of packets from a radio node of a network to recipients, and packets are scheduled for transmission among the different classes based on the received values.

Other advantages and features will become apparent from the following description and from the claims.

DESCRIPTION

[FIG. 1 shows the HDR access network architecture.

FIG. 2 shows the operation of the Qualcomm algorithm.

As mentioned earlier, the RN constructs, from the received IP packets, HDR physical layer packets 37 (FIG. 1) for transmission over the AirLink in the forward direction.

Figure 3:
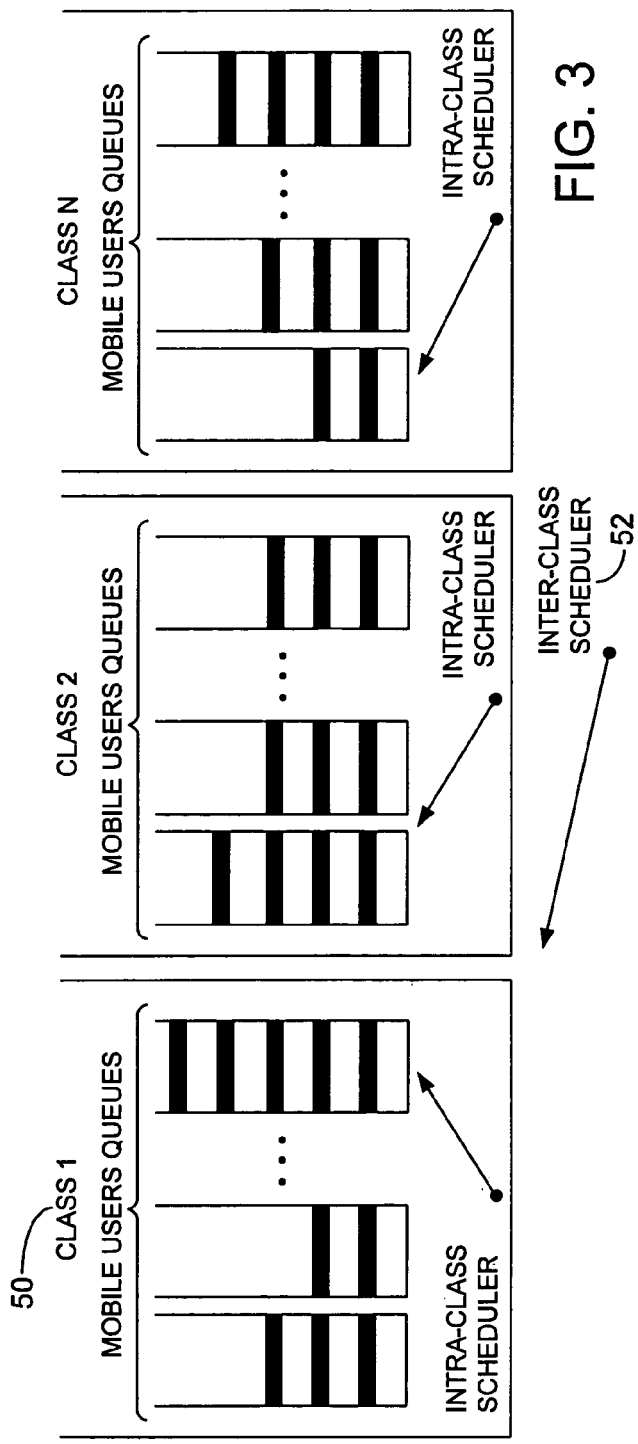
FIG. 3 shows the user queues grouped according to their service class.

As shown in FIG. 3, in some implementations of the invention, the RN maintains multiple outgoing queues 50, one for each DiffServ class. Outgoing Physical Layer packets are placed in these queues based on their DSCP. A scheduling method is provided for HDR physical frames at the RN that supports differentiated services while maintaining a high overall air link throughput.

The scheduling method is not limited to the HDR protocol or to the IETF DiffServ architecture. The method applies to any differentiated services architecture and any communications protocol in which data packets arriving at the communications node can be associated with a corresponding service class and the rate of transmission at the egress of the node varies based on the transmitted packet.

In some examples of the invention, the communications protocol is the HDR protocol, the communications node is the RN of the HDR RAN, and the differentiated services architecture is the IETF DiffServ architecture. The RN can, for example, maintain 5 service queues: one EF queue and 4 AF queues.

The method enables the network operator to configure a Minimum Average Forwarding Rate Percentage (MAFRP) for each of the 5 distinct DiffServ classes 50. The transmission of data packets out of the service queues is scheduled to meet the minimum average forwarding rate percentage guarantees while taking advantage of the temporal variations in users' (i.e., recipients') bit rate requests in order to provide QoS while keeping the overall airlink throughput high. The MAFRP represents the minimum air-link bandwidth percentage (of the variable total forward air-link bandwidth) that the DiffServ class will receive when it is heavily loaded such that its queue is constantly backlogged (i.e. when there is at least one packet awaiting transmission in its queue at all times).

In some examples of the invention, the scheduler is broken into two hierarchical levels: an inter-class scheduler 52 and an intra-class scheduler 54. The inter-class scheduler is concerned with selecting which service class queue to serve and how much data it is allowed to transmit, while the intra-class scheduler is concerned with which mobile user to serve among all the users that have a packet in that class queue. The latter may be accomplished using the Qualcomm algorithm of FIG. 2.

The inter-class scheduler dynamically selects a class queue 50 to receive service and the amount of data it is allowed to transmit based on the following criteria: the configured MAFRP for that class, the actual forwarding rate percentage recently received by that class, and the instantaneous air-link channel quality of the mobile user(s) that are selected to receive service, from within the class, by the intra-class scheduler 54.

The amount of data that a certain class is allowed to transmit at a certain time is an increasing function of the instantaneous air-link channel quality of the mobile user(s) that are selected to receive service within the class, an increasing function of the configured MAFRP for that class, and a decreasing function of the actual forwarding rate percentage recently received by the class. The inter-class scheduler takes advantage of the temporal variation in the air-link channel quality of the users, and thus in the bit rate that the users request, in order to increase the utilization of the air-link bandwidth and thereby increase the aggregate (i.e., across all users) data throughput.

Figure 4:
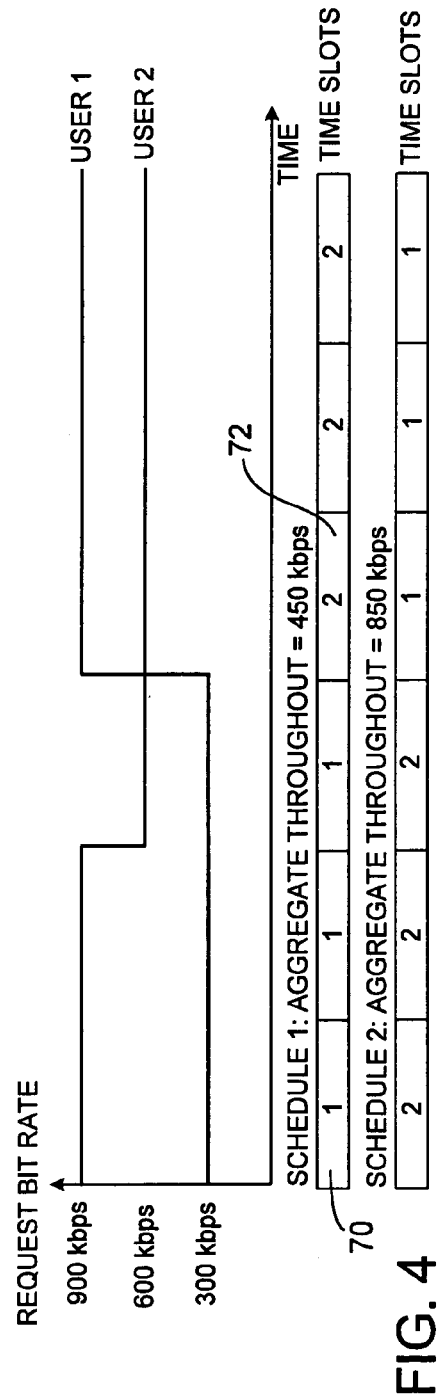
FIG. 4 shows an example of the effect of a scheduler on aggregate data throughput.]

FIG. 4 illustrates how the scheduler can take advantage of the temporal variation of the bit rate requests of the users in order to increase the aggregate data throughput. In FIG. 4, scheduler 1 chooses to serve user 1 when its requested bit rate is equal to 300 kbps for three time slots 70 and user 2 when its requested bit rate is equal to 600 kbps for three time slots 72. The resulting aggregate system throughput over the 6 time slots window is equal to 450 kbps. By serving the users when their requested bit rate is high, scheduler 2 achieves a higher aggregate system throughput of 850 kbps.

Under heavy congestion situations on a single class queue (i.e. when the class queue is constantly backlogged, while other class queues are not), the inter-class scheduler ensures that, over an appropriate time window, the average forwarding rate percentage that the class receives is at least equal to the minimum configured forwarding rate percentage for that class. Under heavy congestion situations across all class queues (i.e. when all class queues are constantly backlogged), the inter-class scheduler ensures that, over an appropriate time window, the average forwarding rate percentage that the class receives is equal to the minimum configured rate percentage for that class.

The choice of the time window over which the MAFRP is guaranteed is important. Over the time window, the forwarding rate percentage may fluctuate below and above the guaranteed rate percentage of that class provided that the average rate percentage over the time window is equal to the guaranteed rate percentage. Therefore, a large time window gives a high flexibility for the inter-class scheduler to take advantage of the temporal variation in the user's channel quality by choosing to serve less (or not serve at all) a user when its requested data rate is low, and to serve that user more when its requested data rate is high.

Clearly, a small time window gives a low flexibility for the inter-class scheduler to take advantage of the temporal variation in the user's channel quality. The fluctuation of the forwarding rate percentage below and above the guaranteed rate percentage of a class affects the delay jitter experienced by the users of that class. The inter-class scheduler allows for different time window values for different classes of service, in order to provide for operator control over the trade-off between the delay jitter experienced by a certain class and the efficiency in air-link bandwidth utilization. The time window values depend on the implementation of the inter-scheduler. In some examples of the invention, the inter-class scheduler is a modified Weighted Round Robin (WRR) scheduling algorithm. The WRR algorithm is enhanced here to provide a more efficient use of the air-link bandwidth, by dynamically adjusting the WRR weight of each class as a function of the air-link quality of the users belonging to that class. The MAFRP for each service class is mapped into a WRR weight, wherein the ratio of the weight assigned to class i over the sum of all weights is equal to the MAFRP for class i. The inter-class scheduling algorithm dynamically scales up or down the WRR weights of each class as a function of the instantaneous air-link quality of the class user(s) selected (by the intra-class scheduler) to receive service, while ensuring that the time average of the scaled weight (for each class), over an appropriate time window, is equal to the configured weight. For high priority service classes, the time window is within the range of 50 ms to 1 sec, with a typical value of 200 ms. For low priority service classes, the time window is typically within the range of 150 ms to 3 secs, with a typical value of 1 sec. The function of the instantaneous air-link quality of the class user(s) may be equal to the average of the DRCs of the user(s) selected by the intra-class scheduler. The inter-class scheduler provides configuration knobs that enable tight control over the variation in the WRR weights for each service class. For instance, the operator may choose not to allow any variation in the WRR weight associated with the DiffServ EF class.

In other examples of the invention, the inter-class scheduler invokes the intra-class scheduler to obtain the identity of the user that will be selected from each service class if the service class were to be chosen to receive service. The inter-class scheduler then selects the class that has the highest $p_i \times (DRC_i/ADRC_i)$ metric, where $DRC_i$ is the instantaneous DRC of the user selected by the intra-class scheduler, $ADRC_i$ is the average of the DRC obtained over an appropriate time window (in the range of 50 ms to 3 sec, with a typical value of 150 ms), and $p_i$ is a scaling factor dynamically adjusted so that the MAFRP is met for each service class. Higher values of $p_i$ should be used for higher MAFRP. The dynamic adjustment of $p_i$ may be done using an adaptive algorithm such as an LMS algorithm (See S. Haykin, Adaptive Filter Theory, 2nd edition, Prentice Hall, 1991).

In yet other examples of the invention, each class i with packets waiting to be transmitted is assigned a schedule time $t_i$. When it is time to send a packet, the inter-class scheduler selects the class with the largest $(DRC_i/ADRC_i)$ metric among all classes that have a $t_i$ within an appropriate window from the smallest $t_i$. After selecting the class, the inter-class scheduler sets its current time to $t_i$. Then the intra-class scheduler selects a user within the class and transmits for it one packet. The new value of $t_i$ for the (selected) class is then set to be equal to: old_$t_i$+$m_i \times (DRC_i/MAFRP_i)$, where $m_i$ is the time taken by the packet transmission. When a packet arrives to a service class that is not scheduled (because no packet is queued in that class), the inter-class scheduler assigns to the class a value $t_i$ equal to: current_time+$am_i/MAFRP_i$, where $am_i$ is the mean packet duration of the packets belonging to the service class. The size of the window for this implementation of the inter-class scheduler is within the range of 50% to 150% of $(m_i \times DRC_i)$. The choice of the window size depends on the desired trade-off between the efficiency in air-link bandwidth utilization and the temporary discrepancy in the guaranteed bandwidth percentages for the service classes.

This implementation of the inter-class scheduler may be modified and used for the intra-class scheduler as an alternative to Qualcomm's algorithm. Each user i with packets waiting to be transmitted is assigned a schedule time $t_i$. When it is time to send a packet, the intra-class scheduler selects the user with the largest $(DRC_i/ADRC_i)$ metric among all users that have a $t_i$ within an appropriate window from the smallest $t_i$. After selecting the user, the intra-class scheduler sets its current time to $t_i$. The new value of $t_i$ for the (selected) class can then be set to: old_$t_i$+$m_i$, or old_$t_i$+$m_i \times DRC_i$, where $m_i$ is the time taken by the packet transmission. If the new value of $t_i$ is chosen to be set to: old_$t_i$+$m_i$, the users within the class will receive a data rates that are proportional to their ADRC. If the new value of $t_i$ is chosen to be set to: old_$t_i$+$m_i \times DRC_i$, the users within the class will receive equal data rates. When a packet arrives to a user that is not scheduled (because no packet is queued for that user), the intra-class scheduler assigns to the user a value $t_i$ equal to: current_time+$am_i$, (if the new value of $t_i$ is chosen to be set to: old_$t_i$+$m_i$) or equal to: current_time+$am_i \times ADRC_i$, (if the new value of $t_i$ is chosen to be set to: old_$t_i$+$m_i \times DRC_i$), where $am_i$ is the mean packet duration of the packets belonging to that user. The size of the window is within the range of 50% to 150% of $m_i$ (if the new value of $t_i$ is chosen to be set to: old_$t_i$+$m_i$) or $(m_i \times DRC_i)$ (if the new value of $t_i$ is chosen to be set to: old_$t_i$+$m_i \times DRC_i$). The choice of the window size depends on the desired trade-off between the efficiency in air-link bandwidth utilization and the temporary discrepancy in the desired relative data rates among the users. Other implementations are within the scope of the following claims.

The invention claimed is:

1. A method comprising
   receiving data packets at a communications node,
   associating each of the received data packets with a service class and a forward link transmission rate,
   transmitting outbound packets corresponding to the received data packets to recipients, and
   controlling a degree to which an order in which the outbound packets are transmitted to the recipients varies based on:
   (a) the forward link transmission rate associated with each of the received data packets corresponding to the outbound packets,
   (b) the service class associated with each of the received data packets corresponding to the outbound packets, and
   (c) a degree to which an average forwarding percentage for the service class associated with each of the received data packets corresponding to the outbound packets falls below a minimum average forwarding percentage rate assigned to the respective service class.

2. The method of claim 1 in which the outbound packets comprise physical layer packets.

3. The method of claim 1 in which the forward link transmission rates are controlled based on a time-division multiplexing algorithm.

4. The method of claim 1 in which the node comprises a radio node of a communications protocol.

5. The method of claim 4 in which the communications protocol comprises HDR.

6. The method of claim 1 in which each service class is one of a set of different service classes that conforms to a differentiated services architecture.

7. The method of claim 6 in which the differentiated services architecture comprises DiffServ.

8. The method of claim 1 in which the service classes comprise at least one expedited forwarding class and at least one assured forwarding class.

9. The method of claim 1 also including receiving a user-defined minimum average forwarding percentage rate for at least one of the service classes.

10. The method of claim 9 in which the percentage comprises a percentage of a total bandwidth of a link on which the outbound packets are transmitted.

11. The method of claim 1 in which the forward link transmission rate of an outbound packet is determined by recipient.

12. The method of claim 11 in which the forward link transmission rates are sent by the recipients using a feedback channel to the node.

13. The method of claim 1 in which the order in which the packets are transmitted is controlled by two-level scheduling including a class level in which ordering is determined among the classes of service and a recipient level in which ordering is determined among the recipients associated with each class.

14. The method of claim 13 in which the recipient level uses the Qualcomm algorithm.

15. The method of claim 13 in which the class level scheduling is based on at least one of the following for each of the classes: a configured minimum average forwarding rate percentage for the class, an actual forwarding rate percentage recently received by the class, and a channel quality for the recipients that belong to the class and are selected to receive service by the recipient level scheduling.

16. The method of claim 13 in which the class level scheduling is done over a predetermined length window of time slots.

17. The method of claim 13 in which the class level scheduling includes a weighted round robin scheduling algorithm in which the weights correspond to channel quality of the recipients belonging to the respective classes.

18. The method of claim 13 in which the class level scheduling is based at least in part on a planned selection at the recipient level within each class.

19. The method of claim 18 in which the class level scheduling is based on a metric scaled by different scaling factors for different service classes.

20. The method of claim 19 in which the scaling factors for all service classes are adaptively adjusted to meet the MAFRP for the service classes.

21. The method of claim 18 in which the class level scheduling is based on a metric which is adaptively adjusted to meet the MAFRP for the service classes.

22. The method of claim 13 in which the class level scheduling selects a class from among a subset of the classes.

23. The method of claim 22 in which the members of the subset of classes are determined by pre-assigned schedule times.

24. The method of claim 13 in which the recipient level scheduling selects a recipient from among a subset of the recipients.

25. The method of claim 24 in which the members of the subset of recipients are determined by pre-assigned schedule times.

26. The method of claim 1 in which the rate of transmission of each of the outbound packets varies based on a quality of a channel that serves the recipient of the outbound packet.

27. The method of claim 26 in which the rate of transmission of each of the outbound packets varies based on an instantaneous quality of a channel that serves the recipient when the outbound packet is to be transmitted.

28. Apparatus comprising
a communications node configured to receive data packets, associate each of the received data packets with a service class and a forward link transmission rate, transmit outbound packets corresponding to the received data packets to recipients, and control a degree to which an order in which the outbound packets are transmitted to the recipients varies based on:
(a) the forward link transmission rate associated with each of the received data packets corresponding to the outbound packets,
(b) the service class associated with each of the received data packets corresponding to the outbound packets, and
(c) a degree to which an average forwarding percentage for the service class associated with each of the received data packets corresponding to the outbound packets falls below a minimum average forwarding percentage rate assigned to the respective service class.

29. A method comprising
receiving from a network operator values representing minimum forwarding performances for each of more than one distinct classes of service associated with transmission of packets from a radio node of a network to recipients, and
scheduling packets for transmission among the distinct classes, the scheduling being based on a quality of an air-link channel that serves the recipient when the packet is to be transmitted and controlling the variability of a degree to which an order in which the packets are transmitted based on a degree to which a forwarding performance of each of the classes is below forward link transmission rates associated with received data packets corresponding to the outbound packets, service classes associated with the received data packets corresponding to the outbound packets, and the minimum forwarding performance for each of the classes.

30. The method of claim 29 in which in which the percentage comprises a percentage of a total bandwidth of a link on which the packets are transmitted.

31. The method of claim 29 further comprising
controlling an order in which the packets are transmitted to the recipients based on rates of transmission and classes of service of the packets.

32. The method of claim 31 in which the order in which the packets are transmitted is controlled by two-level scheduling including a class level in which ordering is determined among the classes of service and a recipient level in which ordering is determined among the recipients associated with each class.

33. The method of claim 31 in which the packets are scheduled for transmission based on at least one of the following for each of the classes: a configured minimum average forwarding rate percentage for the class, an actual forwarding rate percentage recently received by the class, and a channel quality for the recipients that belong to the class and are selected to receive service by the recipient level scheduling.

* * * * *